J. L. HOGAN, Jr.
DETECTOR FOR WIRELESS COMMUNICATION.
APPLICATION FILED DEC. 18, 1909.
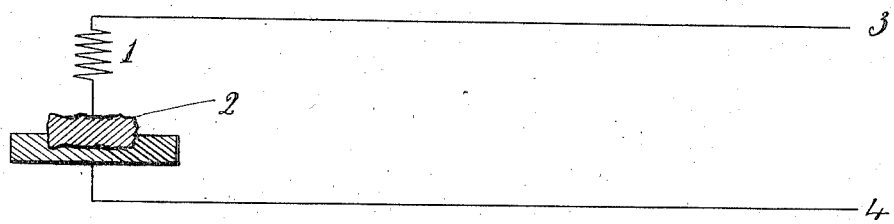
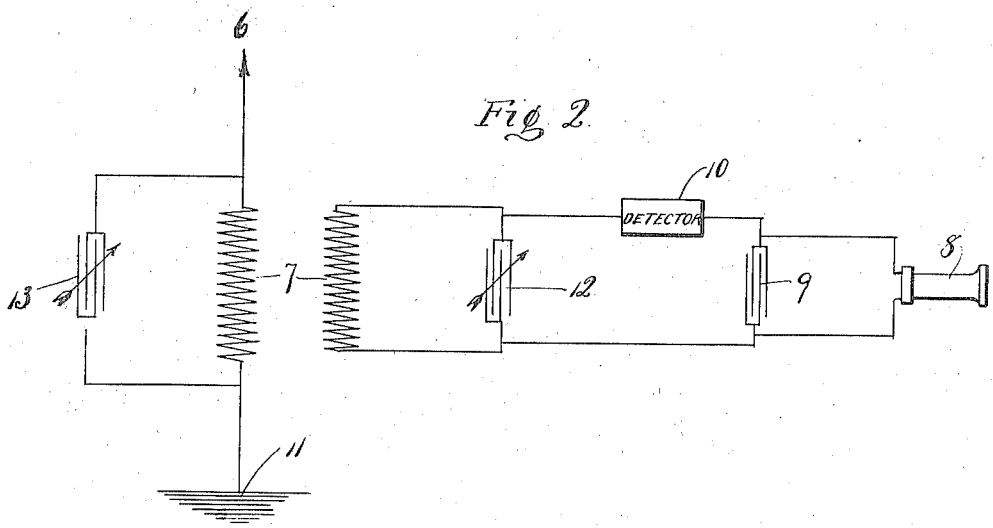

UNITED STATES PATENT OFFICE.

JOHN L. HOGAN, JR., OF NEW YORK, N. Y.

DETECTOR FOR WIRELESS COMMUNICATION.

950,781.  Specification of Letters Patent.  Patented Mar. 1, 1910.

Application filed December 18, 1909. Serial No. 533,806.

*To all whom it may concern:*

Be it known that I, JOHN L. HOGAN, Jr., a citizen of the United States, residing at New York, in the county of New York and State of New York, have invented a new and useful Improvement in Detectors for Wireless Communication; and I do hereby declare the following, when taken in connection with the accompanying drawings and the figures of reference marked thereon, to be a full, clear, and exact description of the same, and which said drawings constitute part of this specification, and represent, in—

Figure 1 a side view partially in section illustrating one form of my invention. Fig. 2 a diagrammatic view illustrating one method of connection in an inductively coupled receiving system.

This invention relates to an improvement in detectors for wireless communication.

The invention may best be understood from a description of one particular method of utilizing the same, which is illustrated in Fig. 1, wherein 1 is a metallic contact whose position may be controlled by means of any suitable mechanism. I find either platinum or nickel a desirable material for this contact, but any other conductor may be used. 2 is a piece of the substance ferro-silicon, suitably mounted according to methods well known in the art. 3 and 4 are the electrical terminals of the device.

I have discovered that an apparatus of this description when used as an oscillation detector has greater sensitiveness and better electrical stability than others of its type. Further, this detector is an aid to close tuning in receiving circuits; probably because the detector has a lower ohmic resistance than is usual in contact apparatus, for it is known that low resistance in an oscillation circuit tends to increase its persistence of vibration and so to define its electrical period more closely.

I am able to explain neither the operation of this detector, nor its superiority over others of the contact class, but I believe that the reasons for both effects lie in some still unrecognized properties of the substance ferro-silicon, which I utilize as an element of my invention.

In the course of my experiments I have tested the compound in various forms and containing different percentages of iron. I find that ferro-silicon is operative in almost any form, although from specimen to specimen the sensitiveness may vary somewhat. Some samples lose much of their sensitiveness after even moderate heating, while others are very rugged and show no loss of detecting power after exposure to very high temperatures. It seems that crystalline structure in the ferro-silicon is not essential to the operation of the detector.

Fig. 2 indicates a method of connection which I have found suitable, but, since the detector operates in many differently connected systems, I do not wish to be understood as limiting my invention to this combination of apparatus. In this figure 6 represents an elevated conductor; 7 an apparatus coupling the open and closed oscillation circuits; 8 a translating device, *e. g.*, a telephone receiver, in a separate shunt circuit across the condenser 9; 10 is the detector of this invention; 11 an earth connection; and 12 and 13 condensers used to vary the electrical constants of the two circuits.

It will be understood that I do not limit my invention to the particular circuits and mechanical arrangements shown and described herein, but that these circuits and mechanical arrangements may be varied as required. As herein used, the phrase "electrical oscillations" is to be understood as meaning "alternating currents of frequencies high as compared to 250 per second, and of constant or varying maximum amplitudes." Also, the term "ferro-silicon" as used herein refers to any operative form of the numerous compounds of iron and silicon.

I claim:—

1. A member of a responsive device for electrical oscillations, consisting of the substance ferro-silicon.

2. A member of a responsive device for electrical oscillations, consisting of a compound of iron and silicon.

3. A member of a responsive device for electrical oscillations, consisting of a fused mixture of iron and silicon.

4. A detector for electrical oscillations consisting of a piece of ferro-silicon in contact with two other conductors.

In testimony whereof, I have signed this specification in the presence of two subscribing witnesses.

JOHN L. HOGAN, JR.

Witnesses:
 FREDERIC C. EARLE,
 CLARA L. WEED.